(12) United States Patent (10) Patent No.: US 7,694,163 B1
Bisbee (45) Date of Patent: Apr. 6, 2010

(54) SYSTEM FOR GENERATING AND MONITORING VOLTAGES GENERATED FOR A VARIETY OF DIFFERENT COMPONENTS ON A COMMON PRINTED CIRCUIT BOARD

(75) Inventor: David C. Bisbee, Princeton, MA (US)

(73) Assignee: EMC Corporation, Hopkinton, MA (US)

( * ) Notice: Subject to any disclaimer, the term of this patent is extended or adjusted under 35 U.S.C. 154(b) by 650 days.

(21) Appl. No.: 11/610,623

(22) Filed: Dec. 14, 2006

(51) Int. Cl.
*G06F 1/26* (2006.01)
(52) U.S. Cl. .................. 713/340; 714/14; 323/243; 363/26
(58) Field of Classification Search ................ 713/340; 714/14; 323/243; 363/26
See application file for complete search history.

(56) References Cited

U.S. PATENT DOCUMENTS 5,703,473 A * 12/1997 Phillips et al. ............. 323/282
5,805,433 A * 9/1998 Wood ......................... 363/16
6,137,188 A * 10/2000 Mitchell et al. .............. 307/29
6,697,952 B1 2/2004 King
2002/0112191 A1* 8/2002 Pelissier et al. ............ 713/300

* cited by examiner

*Primary Examiner*—Thuan N Du

(57) ABSTRACT

A system for generating and monitoring voltages on a variety of different components on a common printed circuit board. The system includes a programmable controller, a plurality of DC/DC converters for producing voltages for the devices and a plurality of voltage regulators for produced voltages for a plurality of CPUs on the board, such CPU voltages being produced in accordance with VIDs provided to the regulator by the CPU. The programmable controller: establishes a set point voltage for such one of the DC/DC converters; sequentially monitors the produced voltages produced, monitors voltages produced by the regulators for the CPUs by comparing the VIDs to the voltages produced by the regulators, and if during the sequencing any one of the converters is determined by the programmable controller as producing an improper voltage or if the any one of the regulators fails top produce the voltage indicated by the VIDs, disables the board.

4 Claims, 4 Drawing Sheets

SYSTEM FOR GENERATING AND MONITORING VOLTAGES GENERATED FOR A VARIETY OF DIFFERENT COMPONENTS ON A COMMON PRINTED CIRCUIT BOARD

TECHNICAL FIELD

This invention relates generally to systems for generating and monitoring voltages and more particularly to a system for generating and monitoring voltages generated for a variety of different components on a common printed circuit board.

BACKGROUND

As is known in the art, many systems require generating and monitoring voltages generated for a variety of different components on a common printed circuit board. One such system is a data storage system used to interface between a large host computer or server (collectively referred to herein as "host computer/servers") and a bank of magnetic disk drives. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As is also known in the art, such a system typically includes a plurality of printed circuit boards having thereon the controllers. These controllers include a plurality of CPUs, DRAMs, ASICs as well as other integrated circuit chips. The CPUs typically require one level and time characteristics of voltages while each of the other ICS require still different levels of voltages.

One technique used to supply a voltage to the CPU is by the CPU generating a digital code, such as the VID code for setpoint control of a voltage regulator used to supply the voltage to the CPU. More particularly, a voltage regulator module (VRM) is used to provide the voltage for the CPU. The VRM is an electronic device that provides a microprocessor (or CPU) the proper supply voltage. The proper supply voltage is communicated by the microprocessor to the VRM at startup via a number of bits called a VID (voltage identificator). In particular, the VRM initially provides a standard supply voltage to the VID logic, which is the part of the processor whose only aim is to then send the VID to the VRM. When the VRM has received the VID identifying the required supply voltage, it starts acting as a voltage regulator, providing the proper voltage supply to the processor.

One technique used to provide different voltages to the different ICs is with a plurality of non-VRM circuits, such as a DC/DC point-of-load (POL) converter, one such non-VRM point-of-load converter for each IC voltage, each one of the point-of-loads providing a different voltage.

SUMMARY

In accordance with the present invention, a system is provided for generating and monitoring voltages on a variety of different components on a common printed circuit board. The system includes a programmable controller, a plurality of DC/DC converters for producing voltages for the devices and a plurality of voltage regulators for producing voltages for a plurality of CPUs on the board, such CPU voltages being produced in accordance with VIDs provided to the regulator by the CPU. The programmable controller: establishes a set point voltage for such one of the DC/DC converters; sequentially monitors the produced voltages; monitors voltages produced by the regulators for the CPUs by comparing the VIDs to the voltages produced by the regulators; and, if during the sequencing any one of the converters is determined by the programmable controller as producing an improper voltage or if any one of the regulators fails to produce the voltages indicated by the VIDs, disables the board.

In accordance another feature of the invention, a system is provided for generating and monitoring voltages on a variety of different components on a common printed circuit board. The system includes a programmable controller having a plurality of registers, each one of the registers storing data representative of a different programmed voltage. A plurality of pulse width modulators is provided on the board, each one being fed by a corresponding one of the plurality of registers. Each one of the plurality of pulse width modulators produces a series of pulses having a pulse duration representative of the programmed voltage stored in the one of the plurality of registers feeding such one of the pulse width modulators. Also provided on the board is a plurality of low pass filters, each one being fed by a corresponding one of the plurality of pulse width modulators. Each one of the plurality of low pass filters produces a voltage representative of the programmed voltage stored in the one of the plurality of registers feeding such one of the pulse width modulators. A plurality of DC/DC converters is provided on the board, each one being fed by a corresponding one of the plurality of low pass filters, each one of the voltages fed to the corresponding one of the DC/DC converters establishing a set point voltage for such one of the DC/DC converters. Each one of the DC/DC converters produces a corresponding output voltage for a correspondingly different one of the devices on the printed circuit board.

With such an arrangement, the use of more expensive digital to analog converters is eliminated through the use of the pulse with modulators and low pass filters.

The programmable controller sequentially enables each one of the converters and sequentially detects the voltage produced by such enabled one of the converters. If, during the sequencing, any one of the converters is determined by the programmable controller as producing an improper voltage, the system is disabled.

In one embodiment, the common printed circuit board has thereon a plurality of voltage regulators and a plurality of CPUs, each one providing a VID for a corresponding one of the plurality of voltage regulators. Each one of the voltage regulators produces a voltage to the corresponding one of the VIDs provided thereto. The board has thereon a multiplexer fed by the plurality of CPUs for passing to the programmable controller the VID of a selected on of the CPUs. The programmable controller monitors the VID produced by the selected one of the CPUs and compares the VID to the voltage produced by the selected one of the regulators feeding the CPU to determine whether such one of the regulators is producing a voltage consistent with the VID.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Figure 1:
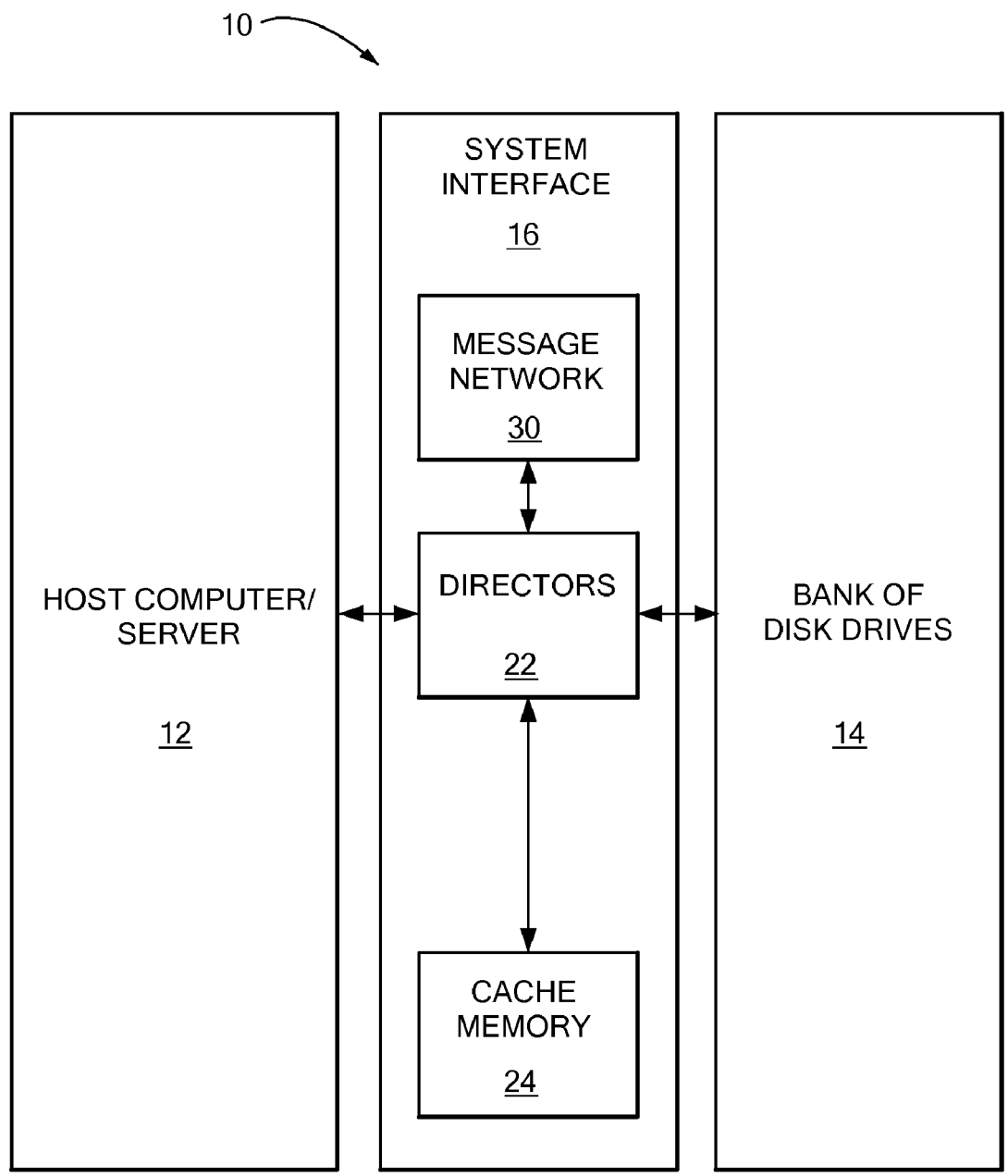
FIG. 1 is a block diagram of a data storage system a system for generating and monitoring voltages a variety of different components on printed circuit boards used in such system according to the invention.

Referring now to FIG. 1, a data storage system 10 is shown for transferring data between a host computer/server 12 and a bank of disk drives 14 through a system interface 16. One such system interface is described in U.S. Pat. No. 7,003,601 entitled "Data storage system having separate data transfer section and message network with plural directors on a common printed circuit board", inventor MacArthur, issued Feb. 21, 2006 and assignee as the same assignee as the present invention, the subject matter thereof being incorporated herein by reference. As described in such U.S. Patent, the system interface 16 includes directors 22, a cache memory 24, and a message network 30.

Figure 2:
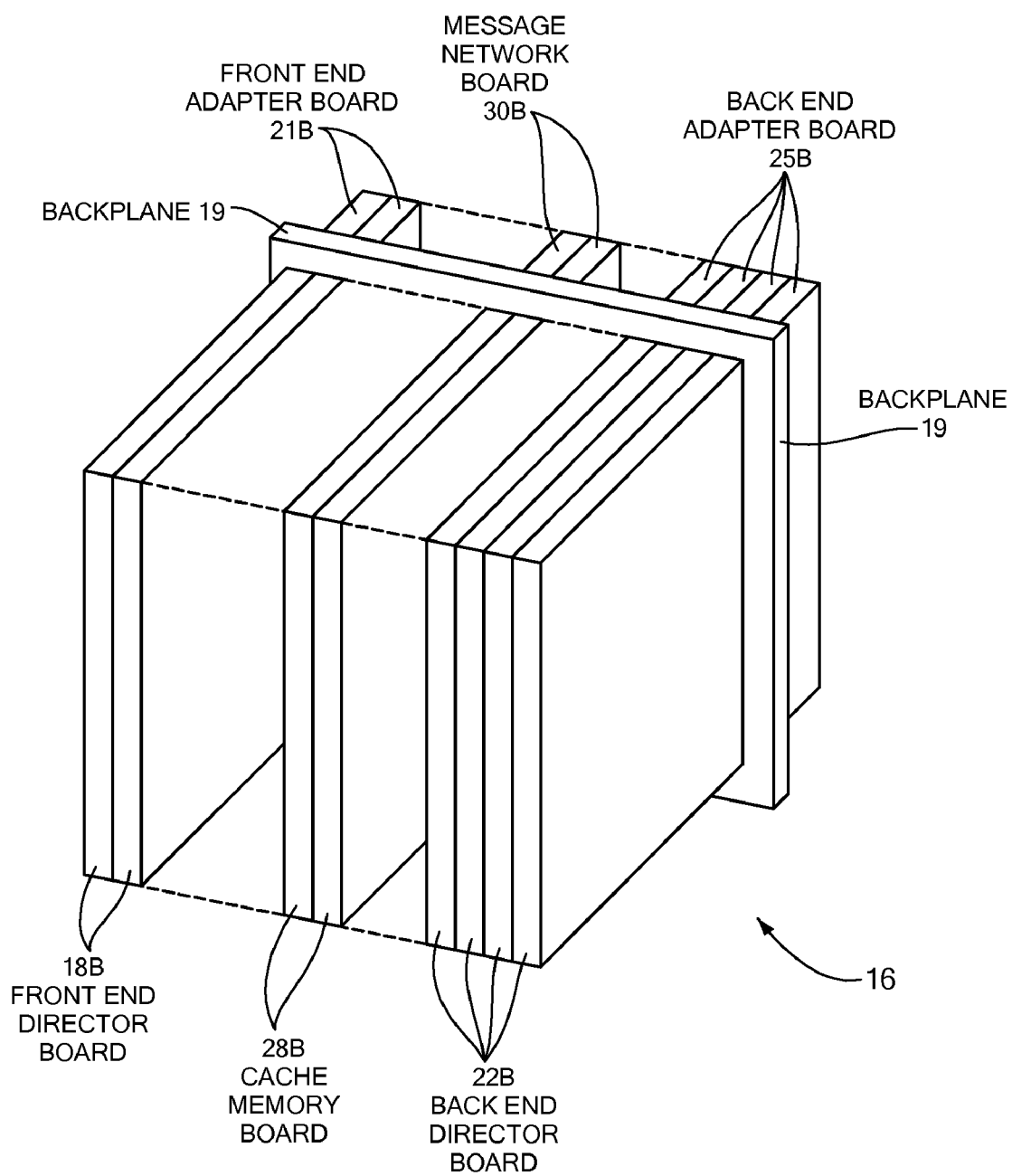
FIG. 2 is a diagram showing an arrangement of printed circuit boards having thereon the system for generating and monitoring voltages a variety of different component of FIG. 1.

The host computer/server controllers, disk controllers, cache memory and message network 30 are interconnected through a backplane printed circuit board. More particularly, disk directors are mounted on disk director (referred to as back end director) printed circuit boards. The host computer/server directors are mounted on host computer/server director (referred to as front end director) printed circuit boards. And, cache memories are mounted on cache memory printed circuit boards. More particularly, referring now to FIG. 2, the system interface 16 is shown to include: the plurality of, front-end director boards 18B, each one having here four of the front-end directors 18, plugged into a first surface of a backplane 19; the plurality of back-end director boards 22B, each one having here four of the front-end directors 22, plugged into the first surface of the backplane 19; and a plurality of memory boards 28B which together make up the global cache memory 28 plugged into the first surface of the backplane 19.

The interface 16 also includes the plurality of front-end adapter boards 21B, each one having here four of the front-end adapters 21, plugged into a second, opposite surface of the backplane 19. It is noted that each one of the front-end adapted boards 21B is mounted behind the corresponding one of the front-end directors boards 18B it is connected to as described above in connection with FIG. 2A.

The interface 16 also includes the plurality of back end adapted boards 25B, each one having here four of the back end adapters 25, plugged into the second, opposite surface of the backplane 19. It is noted that each one of the back end adapter boards 25B is mounted behind the corresponding one of the back end directors boards 2B it is connected to as described above in connection with FIG. 2B.

It is noted that the message network boards 30B making up the message network 30 (FIG. 1) are plugged into the second side of the backplane 19 behind the memory boards 26B as described above in the above referenced U.S. Pat. No. 7,003,601.

Figure 3:
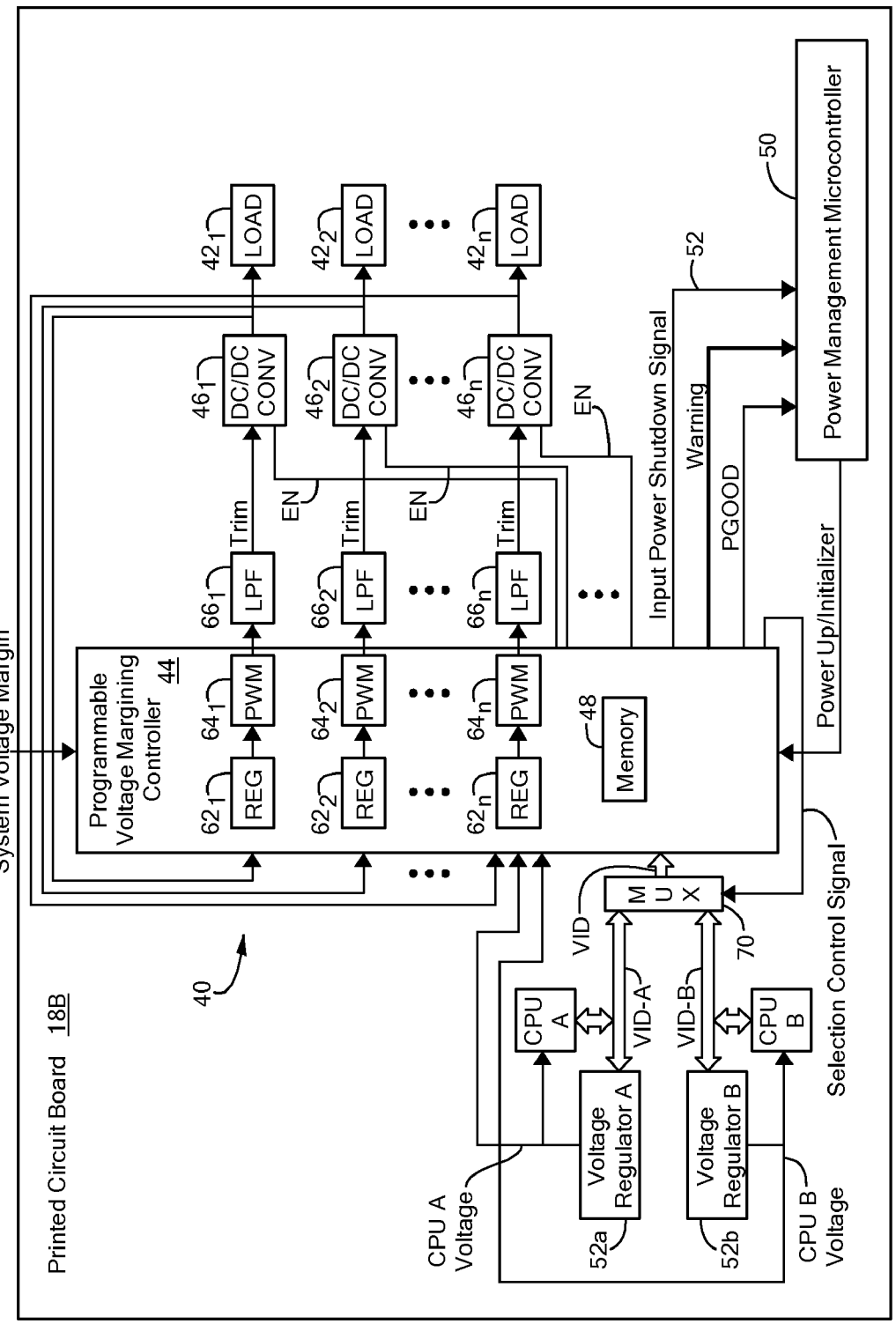
FIG. 3 is a block diagram of the system for system for generating and monitoring voltages a variety of different component according to the invention.

As described therein, each one of the director boards includes a plurality of CPUs and a plurality of ICs, such as DRAMs and ASICs, herein referred to as loads. An exemplary one of the director boards, here board 18B, is shown in FIG. 3 to include a system 40 for generating and monitoring voltages generated for a variety of the different electrical devices (i.e., components or circuits as may be such printed circuit board), here indicated by loads $42'$-$42$. More particularly, the board 18B includes a programmable controller 44 (i.e., a programmable control and monitoring chip (CMD)). The CMD 44 controls the orderly sequential power-up and power-down of DC voltages generated by DC/DC $46_1$-$46_n$ converters, here point-of-load (POL) converter, for the devices or loads $42_1$-$42_n$, here IC devices. This requirement is driven by devices or loads $42_1$-$42_n$, power requirements. The sequencing function performed by the CMD 44 is programmable, such program being stored in a memory 48 within the CMD 44 and allows the sequential turning-on of the POL converters $46_1$-$46_n$ based on the successful power-up of a previous power-up of one of the POL converters $46_1$-$46_n$. Thus, for example, converter $46_1$ is first power-up and the voltage it produces is analyzed by the CMD 44. If the voltage produced by converter $46_1$ is determined to be proper, the CMD 44 powers-up converter $46_2$ while converter $46_1$ remaining powered-up. If the voltage produced by converter $46_2$ is determined to be proper, the CMD 44 powers-up converter $46_3$ and the process continues; however, if the voltage produced by converter $46_2$ is determined to be improper, an error is reported to a power management microcontroller 50 and the entire board 18B is disabled. A successful power-up is determined by the point at which a POL converter reaches a predetermined value in a proper time. Thus, if any POL converters $46_1$-$46_n$ in the power-up sequence fails to power up in a specified amount of time, all previously sequenced power a POL converters $46_1$-$46_n$ will be powered off by the CMD 44 and an error will be reported to the power management controller 50 on an input power shutdown signal on line 52. The power-off may be in a specified order, or all POL converters $46_1$-$46_n$ may be turned off simultaneously, based on programming for the specific application. Thus, if one of the POL converters $46_1$-$46_n$ turns off during normal operation, the CMD 44 has the ability to power all POL converters $46_1$-$46_n$ off. The power-off may be in a specified order, or all POL converters $46_1$-$46_n$ may be turned off simultaneously, based on programming for the specific application. It should be noted that the CMD 44 has a non-volatile flash memory, not shown, for the data logging.

More particularly, the system 40 also includes a plurality of, here for example, two CPUs; designated CPU A and CPU B, a plurality of, here two, voltage regulators 52A, 52B for producing voltages for the CPUs CPU A and CPU B, respectively as shown. The CPU voltages are produced in accordance with VIDs provided to the regulators 52A, 52B by the CPU A and CPU B, respectively. The programmable controller (CMD) 44: establishes a set point or TRIM voltage for such one of the DC/DC converters $46_1$-$46_n$; sequentially monitors the voltages produced by the converters $46_1$-$46_n$; monitors voltages produced by the regulators 52A and 52B for the CPUs CPU A and CPU B, respectively, by comparing the VIDs produced by the CPUs CPU A and CPU B to the actual voltages produced by the regulators 52A and 52B, and if during the sequencing any one of the converters $46_1$-$46_n$ it is determined by the programmable controller as producing an improper voltage or if the any one of the regulators 52A and 52B fails to produce the voltages indicated by the VIDs, the board 18B is disabled Still more particularly, the programmable controller (CMD) 44 includes: a plurality of registers $62_1$-$62_n$, each one of the registers $62_1$-$62_n$ storing data representative of a different programmed voltage corresponding to the TRIM voltage for a corresponding one of the converters $46_1$-$46_n$; a plurality of pulse width modulators $64_1$-$64_n$, each one being fed by a corresponding one of the plurality of registers $62_1$-$62_n$, each one of the plurality of pulse width modulators $64_1$-$64_n$ producing a series of pulses having a pulse width on/off ratio representative of the programmed voltage stored in the one of the plurality of registers $62_1$-$62_n$ feeding such one of the pulse width modulators $64_1$-$64_n$; a plurality of low pass filter $66_1$-$66_n$, each one being fed by a corresponding one of the plurality of pulse width modulators $64_1$-$64_n$, each one of the plurality of low pass filters $66_1$-$66_n$ producing a voltage representative of the programmed voltage stored in the one of the plurality of registers $62_1$-$62_n$ feeding such one of the pulse width modulators $64_1$-$64_n$ Each one of the plurality of DC/DC converters $46_1$-$46_n$ is fed by a corresponding one of the plurality of low pass filters $66_1$-$66_n$. Each one of the voltages fed to the corresponding one of the DC/DC converters $46_1$-$46_n$ establishing a set point or TRIM voltage for such one of the DC/DC converters $46_1$-$46_n$. Each one of the DC/DC converters $46_1$-$46_n$ produces a corresponding output voltage for a correspondingly different one of the devices, here loads $42_1$-$42_n$, on the printed circuit board 18B.

As noted briefly above, the programmable controller (CMD) 44 is programmed to sequentially enable via an enable line EN, each one of the converters $46_1$-$46_n$ and sequentially detect the voltage produced by such enabled one of the converters $46_1$-$46_n$, and if, during the sequencing, any one of the converters 46 is determined by the programmable controller 44 as producing an improper voltage, the board 18B is disabled.

Further, as noted briefly above, the common printed circuit board 18B has thereon: a plurality of, here two voltage regulators 52A, 52B; a plurality of, here two CPUs, CPU A, CPU B, each one providing a VID for a corresponding one of the pair of voltage regulators 52A, 52B, respectively. Each one of the voltage regulators 52A, 52B produces a voltage to the corresponding one of the VIDs provided thereto. A multiplexer 70 is fed by the plurality of CPUs CPU A, CPU B, for passing to the programmable controller 44 the VID of a selected on of the CPUs, such selection being under control of the CMD 44. The programmable controller (CMD) 44 monitors the VID produced by the selected one of the CPUs CPU A, CPU B, and compares the VID to the voltage produced by the selected one of the regulators 52A, 52B feeding the CPU to determine whether such one of the regulators is producing a voltage consistent with the VID.

The general sequencing scheme for a normal system power-up is as follows:

The CMD 44 power is derived from a 12V input voltage supply, Vin;

After Vin from the 12 volt supply reaches a minimum level, the CMD 44 generates an enable signal EN for a first one of the POL converters (i.e., converter $46_1$);

Converter $46_1$ is sequenced ON. A delay may be used.

After Converter $46_1$ reaches a minimum voltage level, Converter $46_2$ is sequenced on. If Converter $46_1$ does not reach the minimum level in a certain amount of time, all POLs will sequence off.

The process is repeated as necessary for other POL converters $46_1$-$46_n$.

When all POL converter $46_1$-$46_n$ outputs are within their prescribed upper and lower limits, a PGOOD signal is asserted by the CMD 44 for the power management microcontroller 50 on the board 18B.

Figure 4:
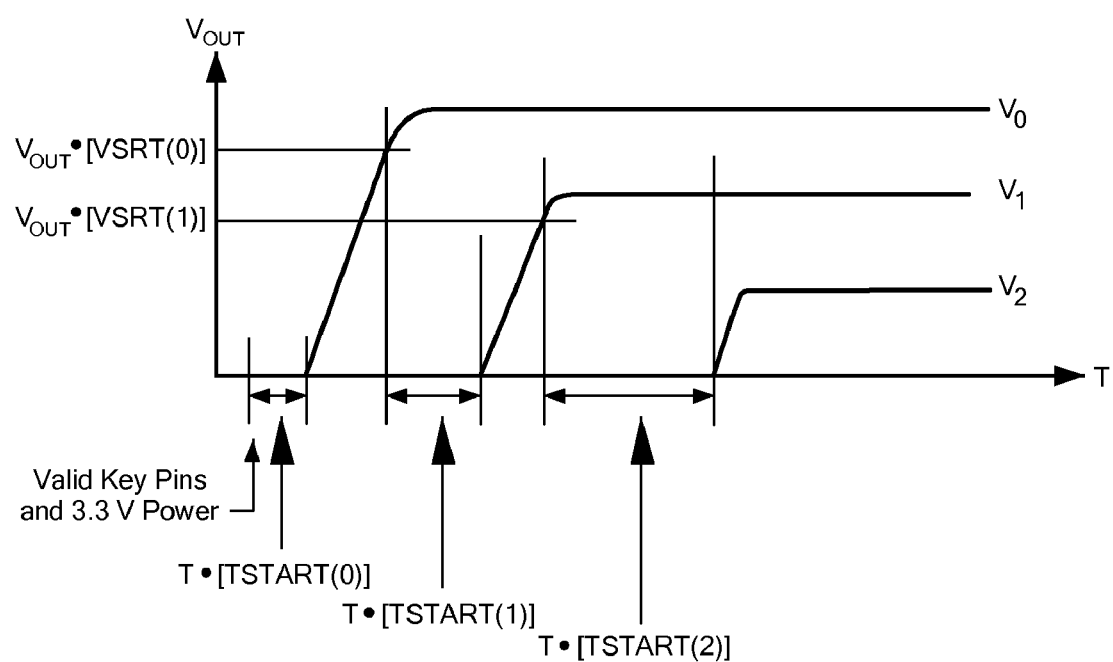
FIG. 4 is timing histories of voltages generated by the system of FIG. 3.

It should be noted that the sequence down order might be reverse of sequence up, or a different order, if a power-down command is received or if the board is unplugged. Time delays may be inserted in any step as needed for sequencing requirements. Multiple POL converters $46_1$-$46_n$ may be enabled or sequenced up simultaneously as required. When power-down occurs due to loss of input power, an orderly sequence down is not achievable. In this case, the outputs may all turn off simultaneously, or in an undefined order. A typical power-up sequence is illustrated in FIG. 4, where $V_0$, $V_1$, and $V_2$ represent the POL converter $46_1$, $46_2$ and $46_3$, outputs respectively. VSRT(x) are programmable thresholds, and TSTART(x) are delays, including POL internal enable delay.

The CMD 44 monitors all DC voltage busses. If a voltage bus falls outside of the monitoring window, the POL converter $46_1$-$46_n$ is assumed to be "bad". The board 18B will then be powered down in order to avoid any potential silent data corruption. PGOOD will be de-asserted and all other POL converters $46_1$-$46_n$ will be sequenced off in a predefined order. A PGOOD signal will be de-asserted and status/indication will be generated. As an alternative, the power management microcontroller 50 receives the PGOOD signal from the CMD 44 and issues a power-off command to the CMD 44, if appropriate. All analog voltage measurement inputs may be read over an I2C interface, for example. A command may be received over the I2C communications bus to initiate a shutdown. The CMD 44 may generate a Warning or PGOOD Fault condition, based on the measured value of the POL converter $46_1$-$46_n$ output voltages with respect to its corresponding limit.

A PGOOD fault is generated by the CMD 44 under the following conditions:

A POL converter $46_1$-$46_n$ fails to power-up in a timely manner, or fails to reach the lower limit (UV condition);

A POL converter $46_1$-$46_n$ goes out of its min/max operating voltage limits during normal operation (UV or OV);

Upon detection of any of the above POL converter $46_1$-$46_n$ faults, the PGOOD line will be de-asserted (driven low), and a Warning* line will be asserted low by the CMD. The PGOOD line is typically used to turn off the input Power Interface Circuit (PIF) (where applicable), to remove input power to the POL converters $46_1$-$46_n$ This method of powering off the board is preferred to handle certain POL $46_1$-$46_n$ failure modes such as an OV condition is which a POL enable signal EN may not provide sufficient protection.

A Warning is generated under the following conditions:

A POL converter $46_1$-$46_n$ goes outside of its min/max Warning limits during normal operation, but does not go outside of its corresponding PGOOD fault limits;

Upon detection of a Warning condition, the WARNING line is asserted low to indicate to the power management microcontroller 50 that there is an abnormal POL converter $46_1$-$46_n$ condition. The intent is that the power management microcontroller 50 may then query the CMD 44 to determine what type of fault exists.

Additional functions provided by the CMD 44 may include:

1. Active setpoint control—the CMD will control the DC/DC output voltages by adjusting the PWM signal until the readback is of a proper value. This is basically a secondary "servo" control loop using the CMD to fine-tune the output voltage. Advantage is that tight control of output voltage can be achieved without the need for costly precision resistors for each DC/DC 2. Voltage margining—when the CMD receives a margin control signal, the DC/DC output voltages will margin to the new level, which is set through a programmable register in the CMD. This is done during the test process to ensure robustness of the design.

3. Communications—the CMD has the ability to receive new values for monitoring limit registers and DC/DC setpoint registers over the communications interface.

4. Data fault logging—the CMD has the ability to log in non-volatile memory, the conditions under which a power-down occurred. This is used to diagnose which device failed or other condition that led to power-down.

A number of embodiments of the invention have been described. Nevertheless, it will be understood that various modifications may be made without departing from the spirit and scope of the invention. For example, the invention may be used with other data storage systems other that that shown in FIG. 1. Accordingly, other embodiments are within the scope of the following claims.

What is claimed is:

1. A system for generating and monitoring voltages a variety of different components on a common printed circuit board, such system comprising:
    a programmable controller;
    a plurality of DC/DC converters for producing voltages for the devices;
    a plurality of CPUs;
    a plurality of voltage regulators for producing voltages for the plurality of CPUs on the board, such CPU voltages being produced in accordance with VIDs provided to the regulators provided by the CPU; and
    wherein the programmable controller:
        establishes a set point voltage for such one of the DC/DC converters;
        sequentially monitors the produced voltages;
        monitors voltages produced by the regulators for the CPUs by comparing the VIDs to the voltages produced by the regulators, and
        if during the sequencing any one of the converters is determined by the programmable controller as producing an improper voltage or if the any one of the regulators fails to produce the voltages indicated by the VIDs, disables the board.

2. A system for generating and monitoring voltages a variety of different components on a common printed circuit board, comprising:
    a programmable controller, such controller comprising:
        a plurality of registers, each one of the registers storing data representative of a different programmed voltage;
        a plurality of pulse width modulators, each one being fed by a corresponding one of the plurality of registers, each one of the plurality of pulse width modulators producing a series of pulses having a pulse width ratio representative of the programmed voltage stored in the one of the plurality of registers feeding such one of the pulse width modulators;
        a plurality of low pass filter, each one being fed by a corresponding one of the plurality of pulse width modulators, each one of the plurality of low pass filters producing a voltage representative of the programmed voltage stored in the one of the plurality of registers feeding such one of the pulse width modulators;
    a plurality of DC/DC converters, each one being fed by a corresponding one of the plurality of low pass filters, each one of the voltages fed to the corresponding one of the DC/DC converters establishing a set point voltage for such one of the DC/DC converters, each one of the DC/DC converters producing a corresponding output voltage for a correspondingly different one of the devices on the printed circuit board, and
    wherein the programmable controller:
        establishes a set point voltage for such one of the DC/DC converters;
        sequentially monitors the produced voltages;
        monitors voltages produced by the regulators for the CPUs by comparing the VIDs to the voltages produced by the regulators, and if during the sequencing any one of the converters is determined by the programmable controller as producing an improper voltage or if the any one of the regulators fails to produce the voltages indicated by the VIDs, disables the board.

3. The system recited in claim 2 wherein the common printed circuit board has thereon:
    a plurality of voltage regulators;
    a plurality of CPUs, each one providing a VID for a corresponding one of the plurality of voltage regulators, each one of the voltage regulators produces a voltage to the corresponding one of the VIDs provided thereto;
    a multiplexer fed by the plurality of CPUs for passing to the programmable controller the VID of a selected on of the CPUs; and
    wherein the programmable controller monitors the VID produced by the selected one of the CPUs and compares the VID to the voltage produced by the selected one of the regulators feeding the CPU to determine whether such one of the regulators is producing a voltage consistent with the VID.

4. A system for generating and monitoring voltages a variety of different components on a common printed circuit board, comprising:
    a programmable controller, such controller comprising:
        a plurality of registers, each one of the registers storing data representative of a different programmed voltage;
        a plurality of pulse width modulators, each one being fed by a corresponding one of the plurality of registers, each one of the plurality of pulse width modulators producing a series of pulses having a pulse width ratio representative of the programmed voltage stored in the one of the plurality of registers feeding such one of the pulse width modulators;
        a plurality of low pass filter, each one being fed by a corresponding one of the plurality of pulse width modulators, each one of the plurality of low pass filters producing a voltage representative of the programmed voltage stored in the one of the plurality of registers feeding such one of the pulse width modulators;
    a plurality of DC/DC converters, each one being fed by a corresponding one of the plurality of low pass filters, each one of the voltages fed to the corresponding one of the DC/DC converters establishing a set point voltage for such one of the DC/DC converters, each one of the DC/DC converters producing a corresponding output voltage for a correspondingly different one of the devices on the printed circuit board; and wherein the programmable controller is programmed to sequentially enable each one of the converters and sequentially detects the voltage produced by such enabled one of the converters, and if, during the sequencing, any one of the converters is determined by the programmable controller as producing an improper voltage, the board is disabled.

* * * * *